Sept. 19, 1944.  F. W. SLACK  2,358,481
MOTOR VEHICLE
Filed April 17, 1942  3 Sheets-Sheet 1
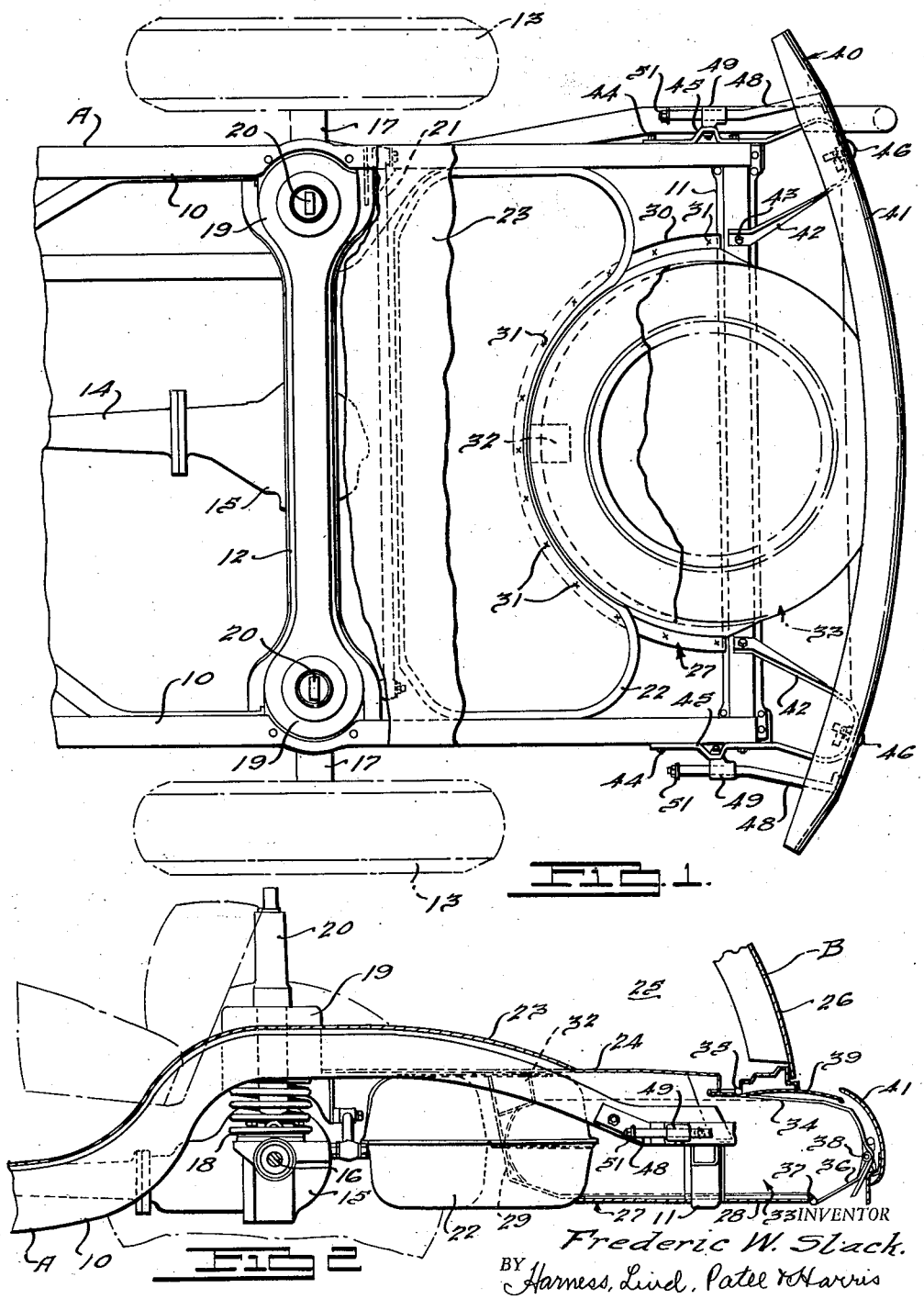
INVENTOR
Frederic W. Slack.
BY Harness, Dickey, Pierce & Harris
ATTORNEYS.

Sept. 19, 1944.　　　　F. W. SLACK　　　　2,358,481
MOTOR VEHICLE
Filed April 17, 1942　　　3 Sheets-Sheet 2
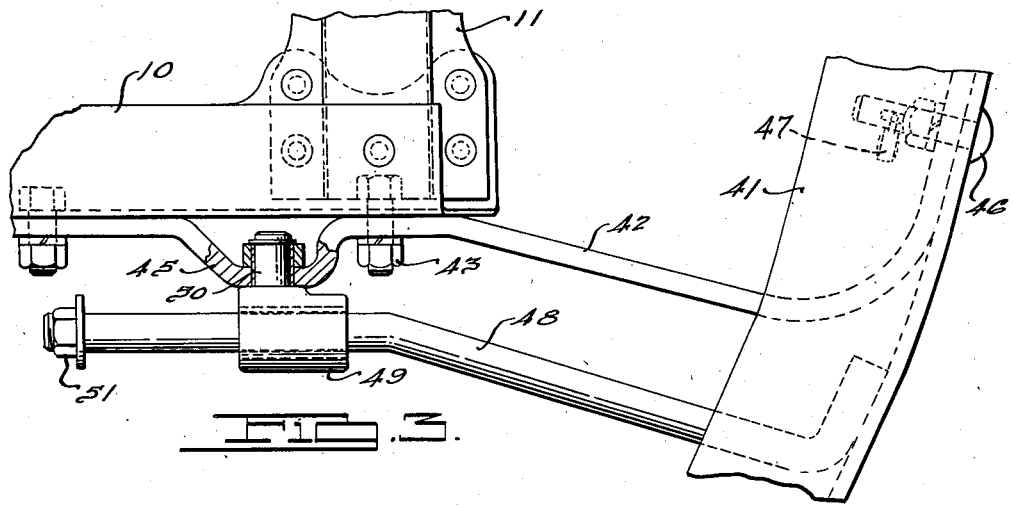
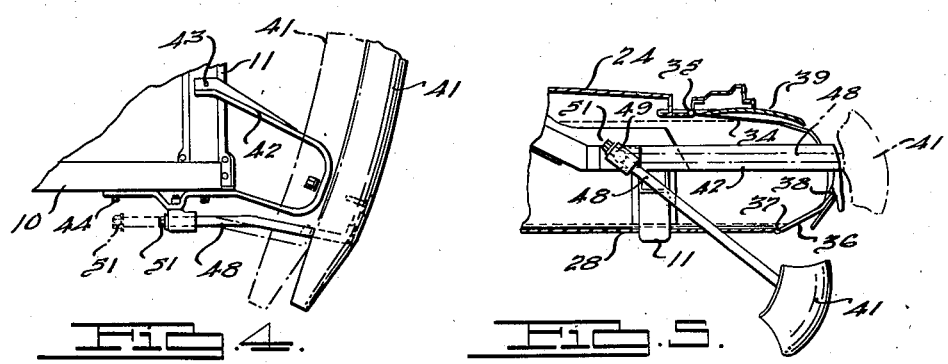
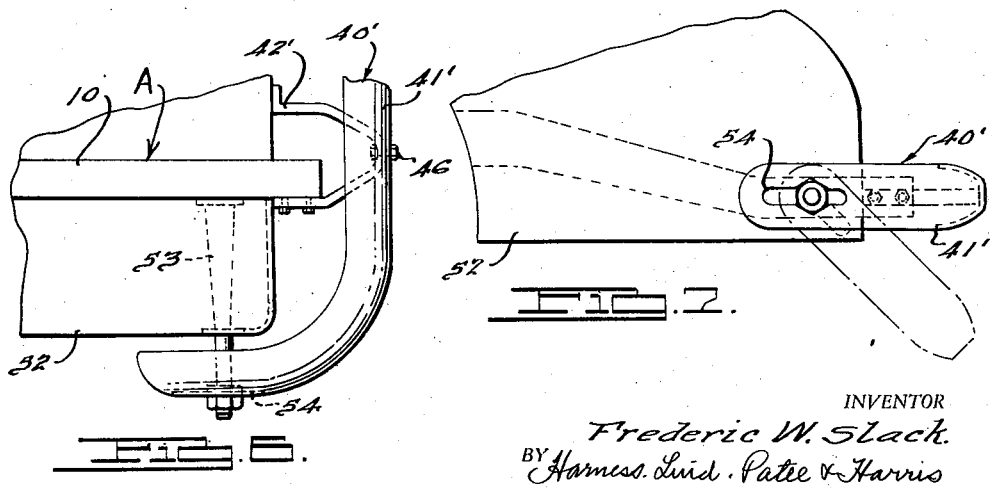
INVENTOR
Frederic W. Slack.
BY Harness, Dick, Patee & Harris
ATTORNEYS.

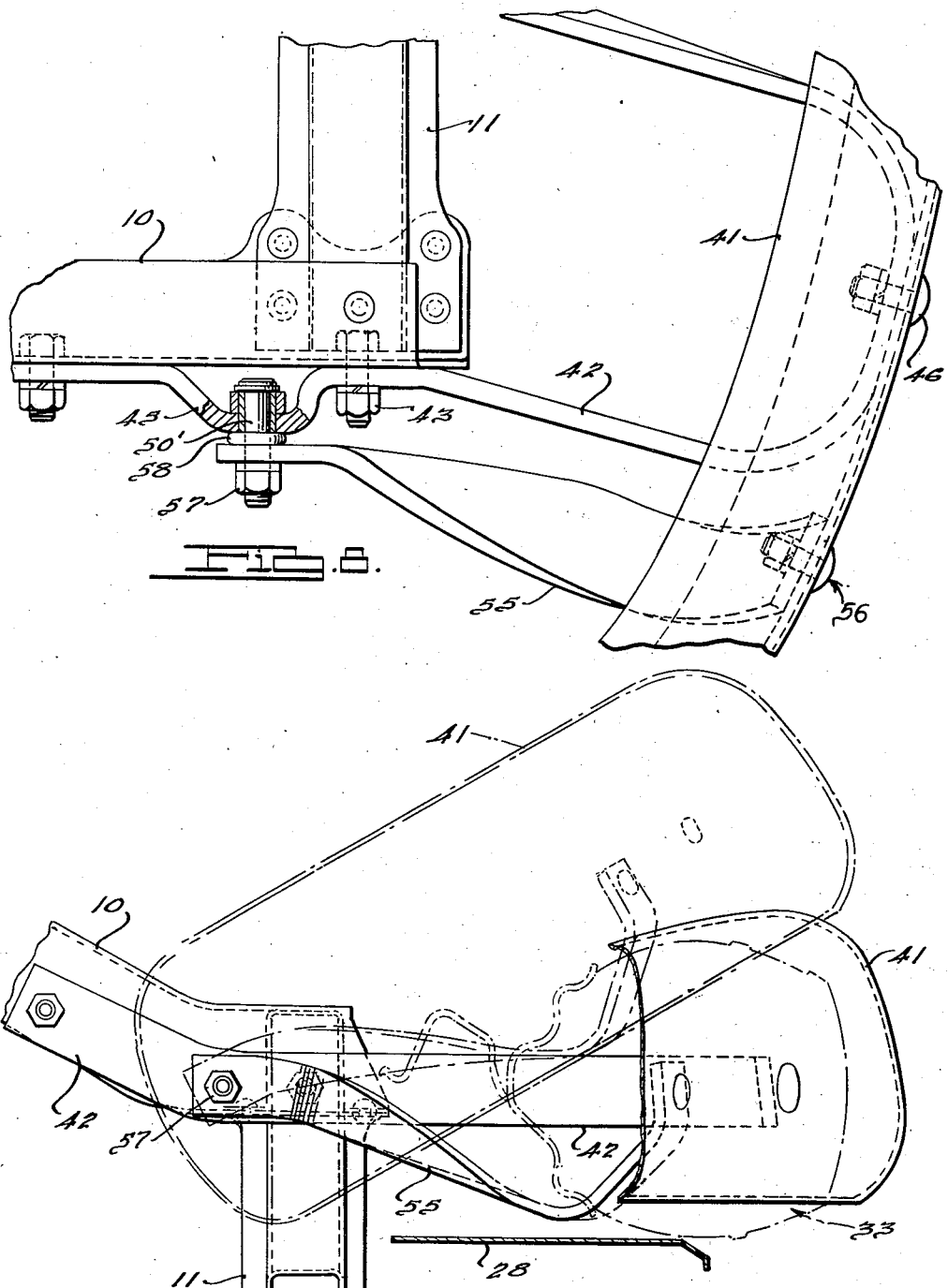

Patented Sept. 19, 1944

2,358,481

UNITED STATES PATENT OFFICE 2,358,481

MOTOR VEHICLE

Frederic W. Slack, Detroit, Mich., assignor to Chrysler Corporation, Highland Park, Mich., a corporation of Delaware Application April 17, 1942, Serial No. 439,415

14 Claims. (Cl. 293—55)

This invention relates to motor vehicles and more particularly to an improved arrangement for providing increased storage capacity especially adapted for carrying a wheel assembly including a tire.

An object of the invention is the provision in a motor vehicle of an improved arrangement for storing the spare vehicle road wheel assembly to protect the latter against unintended removal and undue exposure to the hazards incidental to operation of the vehicle and in such a manner that the assembly does not interfere with or necessitate the utilization of the normal storage facilities for baggage and the like and does not interfere with or interrupt streamlining of the vehicle.

A further object of the invention is the provision of an arrangement according to the foregoing wherein the bumper structure in its normal relatively rigid body protecting position also protects the spare assembly against unintended removal from its stored position and against the hazards incident to vehicle operation, the bumper being releasable for movement to a second position accommodating removal of the assembly; and to provide a connection between the vehicle and bumper structure for supporting the latter when it is released as aforesaid. More specifically the invention provides a supporting connection which accommodates movement of the bumper structure both longitudinally of the vehicle and about an axis when the latter structure is released as aforesaid.

A still further object of the invention is to provide an arrangement according to the foregoing wherein the aforesaid supporting connection will accommodate normal movement of the bumper structure in response to impacts directed thereagainst generally longitudinally of the vehicle when the latter structure is supported in its relative rigid position.

Other objects and advantages of the invention will be more apparent from the following description taken in connection with the accompanying drawings, wherein:

Fig. 1 is a fragmentary top plan view showing the rear portion of a motor vehicle embodying the invention, parts being broken away to show the underlying structure.

Fig. 2 is a side elevational view, partly in section and more particularly illustrating the structure of Fig. 1.

Fig. 3 is an enlarged fragmentary plan view of a typical lateral side of the vehicle chassis with the bumper in its normal position.

Fig. 4 is a view similar to Fig. 3 but showing the bumper released for movement from its normal position to a second position for accommodating removal of the spare wheel assembly from its Fig. 1 position.

Fig. 5 is a side elevational view partly in section showing the bumper in the dotted line position of Fig. 4.

Fig. 6 is a view similar to Fig. 4 but showing another form of the invention.

Fig. 7 is a fragmentary side elevational view of the Fig. 6 showing.

Figs. 8 and 9 are views similar to Figs. 3 and 5, respectively, but showing a still further form of the invention.

Referring to the drawings, and particularly Figs. 1 and 2, the invention is illustrated in connection with a motor vehicle of the type having a chassis frame A, although if desired this frame may be incorporated as a unitary part of the body structure B within the broader aspects of the invention. In either event, it is desirable to provide side frame longitudinals of some form mounted as sprung weight on the road wheels, and the frame A comprises a pair of main side rails 10 having suitable bracing means such as the cross braces 11 and 12.

The drive to the rear ground wheels 13 passes from a propeller shaft 14 to a suitable differential mechanism indicated at 15 and thence through drive shafts, one of which is shown at 16, in the housing 17 to the wheels 13. The chassis frame is supported by laterally spaced coil springs, one of which is shown at 18 in Fig. 2, in housings 19 therefor. Associated with each spring 18 is the shock absorber 20 controlling vertical movement of the frame A and body B, a stabilizer bar 21 controlling body side sway.

Suitably connected to and carried by the frame A is a fuel tank 22 which has the side thereof adjacent the frame cross member 11 indented to provide an arcuate contour, as shown more particularly in Figs. 1 and 2. The body floor 23 extends over the tank 22 and has a portion thereof deflected as at 24 to provide the floor for the storage compartment indicated at 25, access to which compartment is had by raising the conventional hinge body deck lid 26.

A sheet metal member 27 has a portion thereof forming a sub-floor 28 and includes a generally vertically disposed wall 29 of arcuate contour (see Fig. 2) having a flange 30 abutting the bottom surface of the floor portion 24 and welded thereto as indicated at 31 in Fig. 1. The wall 29 has a positioning part 32 extending rearwardly therefrom and spaced vertically from the sub-floor 28, the latter extending rearwardly over and resting upon the downwardly deflected mid part of the cross member 11, as shown more particularly in Fig. 2.

Disposed in the space between the floor portions 24 and 28 is a spare vehicle road wheel assembly, generally indicated by the numeral 33, although it will be understood that in the broader aspects of the invention this space may be utilized for storing and carrying articles other than the assembly 33. This assembly abuts the positioning portion 32 and is held in its illustrated position by means of a fabric strap 34 secured at 35 to the floor portion 24 and cooperating with a similar strap 36 secured at 37 to the floor 28. The straps 34 and 36 are detachably secured together by a suitable buckle structure indicated at 38. A metallic shield 39 extends transversely of the vehicle and overlies the adjacent portion of the assembly 33, as shown in Fig. 2.

A bumper structure, generally indicated by the numeral 40, is provided at the rear of the vehicle and includes a transversely extending bar 41 arcuately shaped in cross section, the upper portion thereof overlying the adjacent peripheral edge portion of the assembly 33. The bar 41 is secured in a relatively rigid position by a pair of laterally spaced substantially U-shaped arms 42, each of which has one leg thereof bolted to the frame cross member 11 as at 43, and the other leg thereof abutting and bolted to the adjacent side rail 10, as shown at 44. Each of the last mentioned legs has a deflected portion 45 spaced laterally from the adjacent side rails 10. Each arm 42 abuts the bumper bar 41 and is secured thereto by a bolt and nut assembly 46, this assembly being provided with a padlock 47 as shown more particularly in Fig. 3 to prevent unintended removal.

In its normal relatively rigid position, as shown in Figs. 1 and 2, the bumper bar 41 registers with the assembly 33 and thereby protects the latter against damage and prevents unintended removal.

A second connection is provided between the frame and bumper in order to accommodate movement of the latter to a position for removing the assembly 33. This connection includes a pair of laterally spaced rod-like arms 48 extending generally longitudinally of the vehicle and having one end thereof fixedly secured to the adjacent end portion of the bar 41. Each rod 48 is slidably received in a sleeve-like portion 49 of a trunnion 50 journalled in the adjacent deflected portion 45, as shown more particularly in Fig. 3, for pivotal movement about an axis extending generally transversely of the vehicle.

When the bumper bar 41 is disconnected from the arms 42 by manipulation of the assembly 46, the bar can then be moved longitudinally of the vehicle and rearwardly a sufficient distance to permit swinging thereof to the position shown in Figs. 4 and 5 to thereby accommodate removal of the assembly 33, a nut 51 threaded onto the end of each rod 48 preventing relative separation of the latter from its sleeve. The sliding connection between the rods 48 and sleeves 49 accommodates deflection of the bumper structure in response to impacts directed against the bar 41, the force of such impacts being directed to the frame through the arms 42 in the conventional manner.

Referring to Figs. 6 and 7 wherein is illustrated a modified form of support for the bumper structure to permit movement thereof to a position for accommodating removal of the assembly 33 stored as illustrated in Fig. 1, the bumper structure 40' includes the bar 41' fixedly secured to the frame structure A by the arms 42', the latter being secured to the bar 41' in the manner set forth in connection with the foregoing embodiment of the invention. Each end of the bar 41' is deflected to extend generally forwardly with respect to the vehicle to overlap the adjacent fender 52. An arm 53 projects outwardly from each frame side rail 10 through the adjacent fender 52 and is received in a slot 54 in the adjacent end of the bar 41'. When the bumper structure 41' is released from the arms 42' by manipulation of the connection 46, the slotted connection between the arms 53 and the bar 41' permits movement of the latter rearwardly and about an axis extending generally transversely of the vehicle, as in the foregoing embodiment. The slot 54 is sufficiently elongated to accommodate normal deflection of the bar 41' in response to impacts directed thereagainst and the force of these impacts is therefore directed against the arms 42' in the conventional manner.

Referring to Figs. 8 and 9, the bumper structure including the bar 41 is mounted to swing about a horizontal axis upwardly or anti-clockwise to a second position for accommodating removal of the assembly 33, it being understood that the bolt and nut assembly at 46 are first removed to disconnect the bar 41 from the arms 42. A pair of sheet metal arms, one of which is shown at 55, connects the bumper bar 41 and the frame structure. Each arm 55 has one end portion thereof secured at 56 to the bumper bar and the other end portion thereof provided with an opening receiving the pivot pin 50' similar to the trunnion 50. The pin 50' is journalled in the offset portion of the arm 42 and the nut 57 retains the associated arm on its pivotal pin, the latter having shoulder 57 interposed between the arm 55 and offset 45.

In order to minimize the effect of shocks directed against the bumper bar 41 and the direct transfer thereof by the arms 55 to the pivot pins 50', the arms 55 are deformed from a normal straight line contour to a tortuous contour, as shown more particularly in Fig. 8, to render such arms more flexible. It will be understood that the bumper bar 41, when in its normal relative rigid position registers with the assembly 33 and prevents removal thereof and is adapted to be swung about a horizontal axis to a non-registering position with respect to this assembly, as shown in Fig. 9, to accommodate removal of the latter.

Although but several embodiments of the invention is herein shown and described, it will be understood that various changes in the size, shape and arrangement of parts may be made without departing from the spirit of my invention and it is not my intention to limit said invention other than by the terms of the appended claims.

I claim:

1. In a motor vehicle including a floor and a chassis frame having a member extending transversely of the vehicle and spaced vertically from the floor, a vehicle road wheel assembly removably supported in the space between the floor and frame member, a bumper bar extending transversely of the vehicle and normally so registering with said assembly as to obstruct removal thereof from said space, bumper bar supporting arms carried by said frame each having a detachable connection with said bumper bar, and a connection between said frame and bumper bar operable in response to release of said bumper bar from said arms to accommodate movement of said bumper bar independently of said assembly in a direction longtiudinally of the vehicle away from said assembly and about an axis extending generally transversely of the vehicle to thereby dispose said bumper bar out of registering relation with said assembly.

2. In a motor vehicle including a floor and a chassis frame having a member extending transversely of the vehicle and spaced vertically from the floor, a vehicle road wheel assembly removably supported in the space between the floor and frame member, a bumper bar extending transversely of the vehicle and normally so registering with said assembly as to obstruct removal thereof from said space, means releasably securing the bumper bar to said frame in said registering relation with said assembly, and a connection between the frame and bumper bar operable in response to release of the latter as aforesaid to accommodate movement of said bumper bar independently of said assembly in a direction longtiudinally of the vehicle and about an axis generally transverse to the vehicle to thereby position said bumper bar out of registering relation with said assembly.

3. In a motor vehicle including a floor and a chassis frame structure having a cross member spaced vertically from the floor, a vehicle road wheel assembly removably supported in the space between the floor and cross member, a bumper structure extending transversely of the vehicle and normally so registering with said assembly as to obstruct removal thereof from said space, spaced members securing said bumper structure to said chassis structure in registering relation with said assembly, each of said members having a detachable connection with said bumper structure, and a connection between said structure accommodating movement of said bumper structure out of registering relation with said assembly when the bumper structure is detached from said securing members, said connection comprising a pair of trunnions pivotally supported from said frame structure and a pair of rods secured to said bumper structure and respectively connected wtih said trunnions for pivotal movement therewith and movement relative thereto in a direction transverse to the axis of pivot.

4. In a motor vehicle including a floor and a chassis frame structure having a cross member spaced vertically from the floor, a vehicle road wheel assembly removably supported in a normal position in the space between the floor and cross member, a bumper structure extending transversely of the vehicle and normally so registering with said assembly as to obstruct removal theerof from said space, spaced members securing said bumper structure to said chassis structure in registering relation with said assembly, each of said members having a detachable connection with said bumper structure, and a connection between said structures accommodating movement of said bumper structure out of registering relation with said assembly when the bumper structure is detached from said securing members and prior to movement of said assembly from its normal supported position, said connection including a pair of spaced arms each having a relatively rigid connection with one of said structures and having a connection with the other of said structures operable to accommodate movement of said bumper structure longitudinally of the vehicle and about an axis extending transversely to the latter.

5. In a motor vehicle including a floor and a chassis frame structure having a cross member spaced vertically from the floor, a vehicle road wheel assembly removably supported in a normal position in the space between the floor and cross member, a bumper structure extending transversely of the vehicle and normally so registering with said assembly as to obstruct removal thereof from said space, spaced members securing said bumper structure to said chassis structure in registtering relation with said assembly, each of said members having a detachable connection with said bumper structure, and a connection between said structures accommodating movement of said bumper structure out of registering relation with said assembly when the bumper structure is detached from said securing members and prior to movement of said assembly from its normal supported position, said connection including a pair of spaced arms each having a relatively rigid connnection with said bumper structure and having a connection with said frame structure operable to accommodate movement of said bumper structure longitudinally of the vehicle and about an axis extending transversely to the latter.

6. In a motor vehicle including a floor and a chassis frame structure having a cross member spaced vertically from the floor, a vehicle road wheel assembly removably supported in a normal position in the space between the floor and cross member, a bumper structure extending transversely of the vehicle and normally so registering with said assembly as to obstruct removal thereof from said space, spaced members securing said bumper structure to said chassis structure in registering relation with said assembly, each of said members having a detachable connection with said bumper structure, and a connection between said structures accommodating movement of said bumper structure out of registering relation with said assembly when the bumper structure is detached from said securing members, said connection including a pair of spaced arms each having a relatively rigid connection with said frame structure and having a connection with said bumper structure operable to accommodate movement of said bumper structure longitudinally of the vehicle and about an axis extending transversely to the latter independently of and prior to movement of said assembly from its normal supported position.

7. In a motor vehicle including a body supporting frame structure having a cross member, a transversely extending bumper structure at the rear of the vehicle, a vehicle road wheel assembly removably disposed forwardly of said bumper structure and supported by said cross member, arms carried by said frame secured to said bumper structure supporting the latter in a normal relative rigid position obstructing removal of said assembly, said arms being releasable from said bumper structure to accommodate movement of the latter to a second position accommodating removal of said assembly, and a connection between said structures accommodating movement of said bumper structure between said positions when said arms are released therefrom, said connection comprising support members each projecting laterally from said frame structure and disposed adjacent a respective end portion of said bumper structure, each of said end portions having a slotted portion receiving the adjacent support member for pivotal movement relative thereto, each of said slots being so elongated as to accommodate movement of the bumper structure in a direction longitudinally of the vehicle as an incident to movement of the latter structure between its said positions.

8. In a motor vehicle including a chassis frame structure having spaced side members and a connecting cross member, a spare vehicle road wheel assembly removably supported by said cross member, a bumper structure extending transversely of the vehicle having a normal position so registering with said assembly as to obstruct removal thereof, laterally spaced members extending generally longitudinally of the vehicle securing said bumper structure to said frame structure in said normal position, each of said securing members having a detachable connection with said bumper structure, and a pair of connecting means spaced laterally with respect to the vehicle connecting said bumper structure with said frame structure for pivotal movement relative to said assembly from said normal position to a second position accommodating removal of said assembly, each of said connecting means including a support element projecting laterally from an adjacent side rail and so connected with said structures as to accommodate swinging of said bumper structure independently of said assembly about an axis extending generally transversely of the vehicle during movement of the latter structure between its said positions.

9. In a motor vehicle including a chassis frame structure having spaced side members and a connecting cross member, a spare vehicle road wheel assembly removably supported by said cross member, a bumper structure extending transversely of the vehicle having a normal position so registering with said assembly as to obstruct removal thereof, laterally spaced members extending generally longitudinally of the vehicle securing said bumper structure to said frame structure in said normal position, each of said securing members being disposed in registering abutting relation with respect to an adjacent frame side rail and secured thereto, a portion of each of said arms registering with its adjacent side rail being deflected into spaced relation to the latter, each of said securing members having a detachable connection with said bumper structure, spaced arms secured to said bumper structure having portions thereof respectively registering with the deflected portions of said members and so connected therewith as to accommodate swinging of said arms and said bumper structure independently of said assembly from said normal position when the bumper structure is detached from said members to a second position for disposing said bumper structure out of registering relation with said assembly.

10. In a motor vehicle including a frame structure having spaced side rails, a spare vehicle road wheel assembly removably supported from sadi frame structure in a normal stored position, a bumper structure extending transversely of the vehicle having a normal position registering with said assembly and obstructing removal thereof, means retaining said bumper structure in its said normal position and operable to release the latter structure for movement from its said normal position to a second position for accommodating removal of said assembly, and arm members attached to said bumper structure and pivotally connected with said frame structure for swinging said bumper structure independently of said assembly and prior to movement of the latter from its normal stored position about an axis between its said positions when the latter structure is released from said retaining means.

11. A motor vehicle including a body and a supporting frame, a carrier for a spare vehicle road wheel assembly supported by the frame and disposed at least in part beneath a portion of the body, a bumper extending transversely of the body, means providing a connection between the bumper and frame for releasably retaining the bumper in a normal position obstructing removal of the assembly from the carrier, and means providing a second connection between the bumper and frame adapted to accommodate swinging of the bumper relative to the frame, carrier and assembly to an unobstructing position with respect to the latter when the bumper is released from its said normal position.

12. A motor vehicle including a body structure and a frame structure, a carrier adapted to store a spare vehicle road wheel assembly disposed at least in part beneath a portion of the body structure and supported by one of said structures, a bumper extending transversely of the body, means providing a connection between the bumper and one of said structures for releasably retaining the bumper structure in a normal position obstructing removal of the wheel assembly from the carrier, and means forming a pivotal connection between the bumper and one of said structures for swinging the bumper upon release thereof from said normal position relative to said carrier and assembly to a second position accommodating removal of the assembly from the carrier.

13. A motor vehicle including a body structure and a frame structure, a carrier adapted to store a spare vehicle road wheel assembly disposed at least in part beneath a portion of the body structure and supported by one of said structures, a bumper extending transversely of the body, means providing a connection between the bumper and one of said structures for releasably retaining the bumper structure in a normal position obstructing removal of the wheel assembly from the carrier, and means forming a pivotal connection between the bumper and one of said structures for swinging the bumper upon release thereof from said normal position relative to said carrier and assembly to a second position accommodating removal of the assembly from the carrier, said pivotally connecting means including members swingable with the bumper and pivotally connected with the last mentioned one of said structures for guiding movement of the bumper during swinging thereof between said positions.

14. A motor vehicle including a body structure and a chassis structure, one of said structures including support for storing a spare vehicle road wheel assembly extending beneath the main portion of said body structure at the rear thereof, a bumper at the rear of and extending transversely of said structures having a normal position wherein said bumper cooperates with said structures to obstruct removal of said assembly when the latter is in its stored position, means releasably retaining the bumper in its said normal position, and means providing a pivotal connection between one of said structures and the bumper for guiding swinging movement of the latter upon release thereof from said normal position independently of and relative to said assembly and said support to another position unobstructingly accommodating removal of the assembly from its stored position.

FREDERIC W. SLACK.